United States Patent
Starr (10) Patent No.: US 7,318,180 B2
(45) Date of Patent: *Jan. 8, 2008

(54) METHOD AND SYSTEM FOR ADAPTIVE INTERLEAVING

(75) Inventor: Thomas J J Starr, Barrington, IL (US)

(73) Assignee: AT&T Knowledge Ventures L.P., Reno, NV (US)

( * ) Notice: Subject to any disclaimer, the term of this patent is extended or adjusted under 35 U.S.C. 154(b) by 100 days.

This patent is subject to a terminal disclaimer.

(21) Appl. No.: 11/273,690

(22) Filed: Nov. 14, 2005

(65) Prior Publication Data

US 2006/0080588 A1    Apr. 13, 2006

Related U.S. Application Data (60) Division of application No. 10/339,659, filed on Jan. 9, 2003, now Pat. No. 7,200,794, which is a continuation of application No. 09/884,878, filed on Jun. 19, 2001, now Pat. No. 6,546,509, which is a continuation of application No. 09/482,431, filed on Jan. 13, 2000, now Pat. No. 6,272,652, which is a continuation of application No. 09/062,293, filed on Apr. 17, 1998, now Pat. No. 6,067,646.

(51) Int. Cl.
  *G06F 11/00* (2006.01)
  *H03M 13/00* (2006.01)
(52) U.S. Cl. .................. 714/701; 714/708; 714/704; 714/774
(58) Field of Classification Search ................ 714/701, 714/708, 704, 774
See application file for complete search history.

(56) References Cited

U.S. PATENT DOCUMENTS 3,623,022 A    11/1971    Day
4,063,038 A    12/1977    Kaul et al.
4,156,867 A    5/1979     Bench et al.
4,312,070 A    1/1982     Coombes et al.
4,394,642 A    7/1983     Currie et al.
4,691,176 A    9/1987     Hsiung et al.
4,829,526 A    5/1989     Clark et al.
4,833,693 A    5/1989     Euyboglu
4,901,319 A    2/1990     Ross
4,910,794 A    3/1990     Mahany
5,052,000 A    9/1991     Wang et al.
5,056,105 A    10/1991    Darmon et al.
5,263,051 A    11/1993    Eyuboglu
5,274,667 A    12/1993    Olmstead

(Continued)

*Primary Examiner*—Joseph D. Torres
(74) *Attorney, Agent, or Firm*—Brinks Hofer Gilson & Lione (57) ABSTRACT

A method a system for automatically controlling an adaptive interleaver involves monitoring performance parameters of a transmission system and controlling the adaptive interleaver in response to the performance parameters. The SNR and the data rate of the transmission system are preferably determined. The data rate is analyzed and the adaptive interleaver is adjusted in response to the data rate and the SNR. Alternatively, the BER and the data rate of the transmission system are determined. The data rate is analyzed and the adaptive interleaver is adjusted in response to the data rate and the BER. Alternatively, any one of the SNR, BER or data rate can alone be monitored and used to the adaptive interleaver. The system provides a effective system for adjusting an adaptive interleaver in response to performance parameters of a transmission system.

8 Claims, 10 Drawing Sheets

U.S. PATENT DOCUMENTS

| | | |
|---|---|---|
| 5,287,556 A | 2/1994 | Cahill |
| 5,335,247 A | 8/1994 | Olmstead |
| 5,384,782 A | 1/1995 | Elms |
| 5,425,051 A | 6/1995 | Mahany |
| 5,483,676 A | 1/1996 | Mahany et al. |
| 5,541,955 A | 7/1996 | Jacobsmeyer |
| 5,657,342 A | 8/1997 | Olmstead |
| 5,812,786 A | 9/1998 | Seazholtz et al. |
| 6,067,646 A * | 5/2000 | Starr .......... 714/701 |
| 6,272,652 B1 * | 8/2001 | Starr .......... 714/701 |

* cited by examiner

METHOD AND SYSTEM FOR ADAPTIVE INTERLEAVING

CROSS-REFERENCE TO RELATED APPLICATIONS

This application is a division of U.S. patent application Ser. No. 10/339,659, filed Jan. 9, 2003, now U.S. Pat. No. 7,200,794, which is a continuation of U.S. patent application Ser. No. 09/884,878, filed Jun. 19, 2001 (now U.S. Pat. No. 6,546,509), which is a continuation of U.S. patent application Ser. No. 09/482,431, filed Jan. 13, 2000 (now U.S. Pat. No. 6,272,652), which is a continuation of U.S. patent application Ser. No. 09/062,293, filed Apr. 17, 1998 (now U.S. Pat. No. 6,067,646), each of which is hereby incorporated by reference.

BACKGROUND

The present invention relates generally to transmission systems and more specifically to adaptive interleavers.

Interleaving is a coding technique that is commonly used to increase the performance of transmission systems by decreasing errors in the system. Interleaving rearranges the data that is to be transmitted in a given transmission thereby improving the error-correction performance of redundancy coding techniques. Interleaving increases the transmission latency of the interleaved transmissions. Latency is the time required for data to traverse the end-to-end transmission path.

In most applications, the latency associated with interleaving is only a small portion of the overall latency of the system. However, in telecommunications applications, and particularly with reference to digital subscriber lines, the latency associated with interleaving constitutes a significant portion of the overall latency. High latency can have a substantial negative impact on system performance especially when the system is operating at high data transmission rates. The impact is especially pronounced for systems where many end-to-end transmissions are required to accomplish a task, such as systems utilizing the popular TCP/IP data communications protocol to send a large file. Accordingly, telecommunications system providers generally strive to minimize latency throughout their systems while still utilizing interleaving to offset the adverse effects of errors. Thus, it is desirable to optimize the interleaving used such that only the degree of interleaving necessary to achieve a desired performance level is implemented.

Adaptive interleaving allows for different degrees of interleaving, commonly referred to as the interleave depth, to be applied to different transmissions. Adaptive interleavers are known to those skilled in the art. U.S. Pat. No. 4,901,319 describes an adaptive interleave system, including an adaptive interleaver, that attempts to correct errors that occur as a result of the fading characteristics of a radio channel. The system measures the phase error of transmissions in an effort to identify errors in the transmissions. The system utilizes a complex system and method to predict the next error occurrence based upon the measured phase error, and adjusts the adaptive interleaver in response to the prediction. However, measuring the phase error is not an effective method for identifying errors in many transmission systems. Also, a complex system for predicting the occurrence of errors and controlling an adaptive interleaver can be difficult to implement on many transmission systems.

DETAILED DESCRIPTION OF THE PRESENTLY PREFERRED EMBODIMENTS

Figure 1:
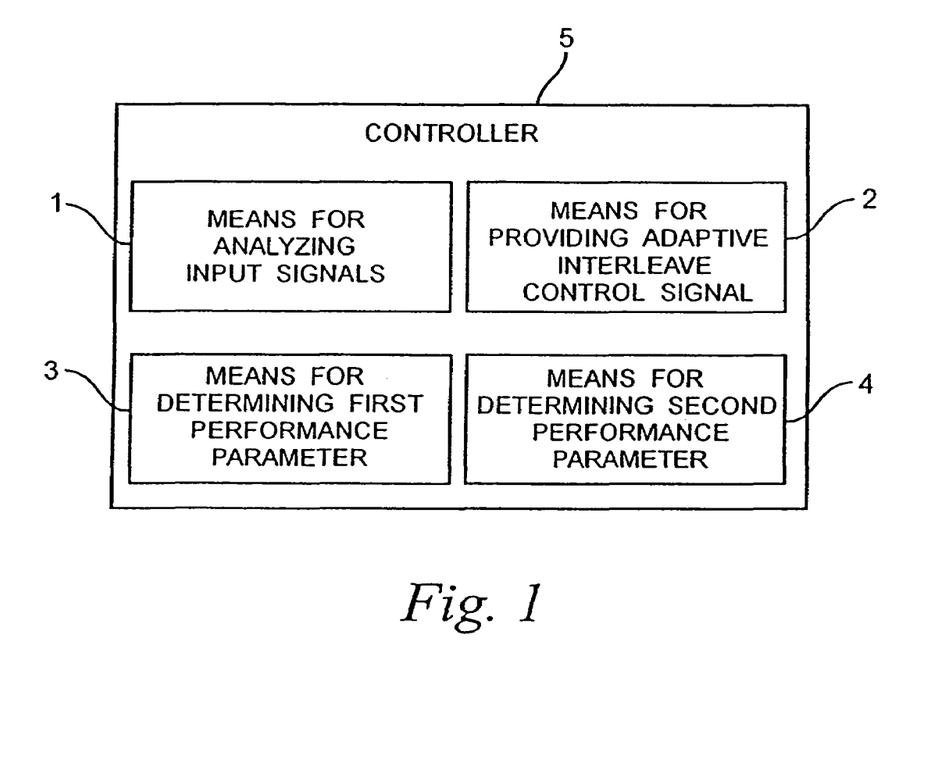
FIG. 1 is a block diagram of the adaptive interleaver controller of a first preferred embodiment.

The present embodiments provide an effective system for automatically controlling an adaptive interleaver in response to the performance parameters of a transmission system. Referring now to FIG. 1, a controller 5 for determining one or more performance parameters and generating an adaptive interleave control signal in response to the performance parameters is shown. The controller 5 preferably comprises means 1 for analyzing input signals, means 2 for providing an adaptive interleave control signal, means 3 for determining a first performance parameter and means 4 for determining a second performance parameter. The means 3 for determining a first performance parameter preferably comprises a first performance parameter monitor for determining a first performance parameter and generating a first input signal as known to those skilled in the art. The means 4 for determining a second performance parameter preferably comprises a second performance parameter monitor for determining a second performance parameter and generating a second input signal as known to those skilled in the art. The performance parameters are preferably chosen from the group consisting of signal to noise ratio (SNR), bit error rate (BER) and data rate.

As illustrated in the following embodiments, the system preferably determines the SNR and the data rate of the transmission system. The data rate of the system is analyzed and the adaptive interleaver is adjusted in response to the data rate and the SNR. Alternatively, the bit error rate (BER) and the data rate of the transmission system can be determined. The data rate of the system is analyzed and the adaptive interleaver is adjusted in response to the data rate and the BER. Alternatively, any one of the SNR, BER or data rate can alone be determined and used to control the adaptive interleaver. While such a system is of particular importance with regard to digital subscriber lines, those skilled in the art will appreciate that it is applicable to any system that incorporates interleaving.

Figure 2:
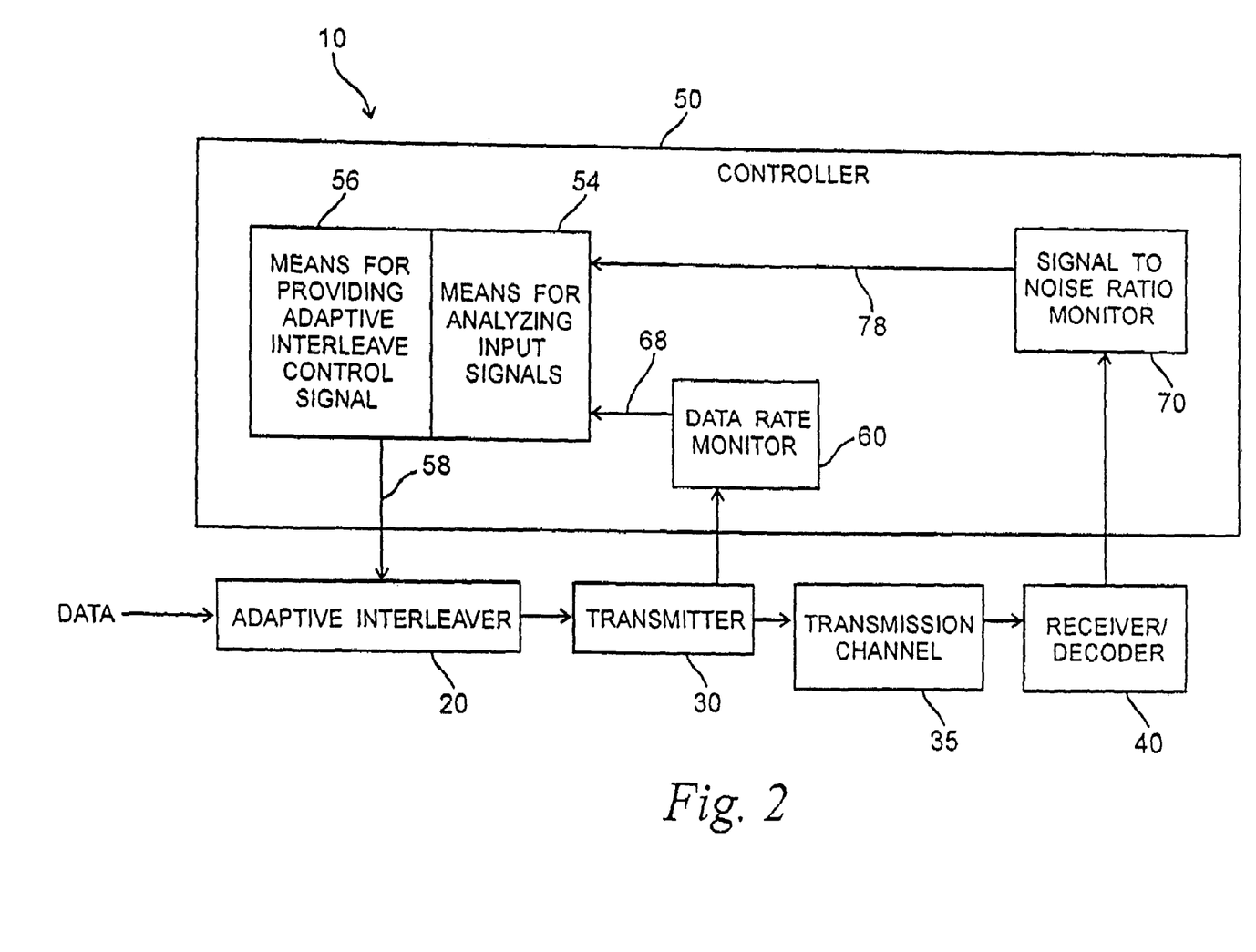
FIG. 2 is a more detailed block diagram of the adaptive interleaver controller of FIG. 1.

By way of example, FIG. 2 shows a transmission system 10 comprising an adaptive interleaver 20, a transmitter 30, a transmission channel 35, a receiver/decoder 40 and a controller 50. The adaptive interleaver 20 interleaves data that is transmitted by the transmitter 30 over the transmission channel 35. The receiver/decoder 40 receives and decodes the interleaved data. The controller 50 determines performance parameters of the system in an effort to determine whether interleaving is beneficial and if it can be implemented. The controller also generates an adaptive interleave control signal 58 in response to the performance parameters. The adaptive interleaver preferably adjusts the interleave depth in response to the adaptive interleave control signal 58.

The adaptive interleaver 20 preferably comprises means for receiving a multiple bit adaptive interleave control signal and means for adjusting the interleave depth in response to the adaptive interleave control signal as known to those skilled in the art. The adaptive interleaver 20 preferably further comprises means for adaptively interleaving data at different interleave depths as known to those skilled in the art. The adaptive interleaver 20 is preferably coupled with the transmitter 30 and the controller 50. The phrase "coupled with," as used herein, means coupled either directly or indirectly via one or more intervening elements. One example of an adaptive interleaver is shown in U.S. Pat. No. 4,901,319 which is hereby incorporated by reference.

The adaptive interleaver 20 preferably receives data and interleaves the data by rearranging the order in which the bits that comprise the data are transmitted. The interleave depth is preferably defined as the distance between bits that originally were adjacent to one another. The interleave depth is altered by varying the distance between originally adjacent bits. The data is preferably encoded through the use of coding techniques known to those skilled in the art before it is received by the adaptive interleaver 20. Alternatively, any suitable adaptive interleaver that is responsive to a multiple bit adaptive interleave control signal, as known to those skilled in the art, can be configured for use in the present embodiments.

The transmitter 30 preferably comprises an Asymmetric Digital Subscriber Line (ADSL) transmitter as known to those skilled in the art. Alternatively, the transmitter 30 can comprise a digital transmitter for use with any form of transmission media as known to those skilled in the art. Alternatively, the transmitter 30 can comprise any transmitter for use with any form of transmission media as known to those skilled in the art. The transmitter 30 is preferably coupled with the adaptive interleaver 20, the data rate monitor 60 and the transmission channel 35.

The transmitter 30 modulates data for transmission to the receiver/decoder 40 via the transmission channel 35 as known to those skilled in the art. The transmitter 30 can preferably transmit data at different data rates as known to those skilled in the art. The capacity of the transmission channel 35 is one common factor that can be used as a basis for adjusting the data rate. The capacity of the transmission channel 35 typically depends on factors including the following: the distance a transmission has to travel; the wire gauge of the transmission channel; the number of bridged-taps on the transmission channel; the temperature of the transmission channel; the splice loss of the transmission channel; noise present in the transmission channel; and the precision of the transmitter and receiver. While many of these factors are not directly measurable, their cumulative effect may be monitored by measuring one or both of the SNR and BER of the system. Thus, the data rate can be adapted in response to the SNR or BER.

The transmitter 30 typically adapts the data rate by altering the time allowed for the transmission of a symbol comprising a number of bits. Accordingly, a greater or lesser number of bits can be transmitted within a given time interval depending upon the alterations. Alternatively, the data rate can be altered by modulating a greater or lesser number of bits into each transmission. For example, increasing the number of usable points in a Quadrature Amplitude Modulation (QAM) constellation results in the modulation of more bits in each transmission. When the data rate is increased through either of these methods, the SNR of the system is generally decreased. A decrease in the SNR generally results in an increase in the BER when the data rate increases or is unchanged. Thus, to maintain a given BER, there is a upper limit for the data rate for a particular transmission channel. Accordingly, by monitoring the SNR and BER, the data rate can be adapted, through the use of the methods described above, to the maximum data rate possible while maintaining an acceptable BER. The data rate can be adapted once at system start-up, or continuously as known to those skilled in the art.

The transmission channel 35 preferably comprises twisted-pair conductive wire as known to those skilled in the art. Alternatively, the transmission channel can comprise coaxial cable, optical fiber, free-space laser, radio or any other type of transmission media as known to those skilled in the art. The transmission channel 35 is preferably coupled with the transmitter 30 and the receiver/decoder 40.

The receiver/decoder 40 preferably comprises an ADSL receiver, an adaptive de-interleaver and a sequential decoder as known to those skilled in the art. Alternatively, the receiver/decoder 40 can comprise a digital receiver/decoder for use with any type of transmission media as known to those skilled in the art. Alternatively, the receiver/decoder 40 can comprise any type of receiver/decoder for use with any type of transmission media as known to those skilled in the art. For example, the receiver/decoder 40 can employ a Reed Solomon decoder or any other suitable error correcting decoder as known to those skilled in the art. The receiver/decoder 40 is preferably coupled with the transmission channel 35 and the signal to noise ratio monitor 70.

The receiver/decoder 40 receives and demodulates the data from the transmitter 30. After demodulation, the receiver/decoder 40 de-interleaves the data and utilizes decoding techniques known to those skilled in the art to detect and correct errors in the data. For example, the receiver/decoder 40 can analyze data including redundant bits that are generated by an encoder prior transmission, to determine whether any data was corrupted and thus requires correction.

The controller 50 preferably comprises a data rate monitor 60, a signal to noise ratio monitor 70, means 54 for analyzing input signals and means 56 for providing an adaptive interleave control signal. The data rate monitor 60 preferably comprises a monitor for determining the data rate of the system 10 as known to those skilled in the art. The data rate monitor 60 is preferably coupled with the transmitter 30 and the controller 50. The data rate can be determined by counting the number of bits, bytes, symbols, blocks, frames, cells, or packets sent per time interval as known to those skilled in the art. Alternatively, the data rate can be inferred from the frequency of the master clock signal used by the transmitter or from the symbol rate detected by the receiver/decoder 40 as known to those skilled in the art. Alternatively, for manually controlled systems, the value in the data register holding the data rate that is set by the operator can be directly accessed by the data rate monitor 60 to determine the data rate. Alternatively, the data rate can be determined through a variety of other techniques, and any suitable method for determining the data rate can be adapted for use in the presently preferred system. Averaging many measurements of the data rate can be performed to improve the accuracy of the current data rate calculations as known to those skilled in the art.

The data rate monitor 60 determines the data rate and generates an input signal 68 that preferably varies as a function of the data rate. Alternatively, the input signal 68 can take many forms. The input signal 68 can be based in-whole or in-part on the data rate. The input signal 68 can be analog or digital and linear or non-linear as known to those skilled in the art. Alternatively, the input signal 68 can be binary such that input signal 68 is greater than or less than a threshold value based upon the data rate as known to those skilled in the art. The data rate monitor 60 preferably determines the data rate and continuously generates the input signal 68. Alternatively, the data rate monitor 60 can determine the data rate and generate the input signal 68 in a sampled fashion on a random or non-random basis.

The signal to noise ratio monitor 70 preferably comprises a monitor for determining the SNR as known to those skilled in the art. The SNR monitor 70 is preferably coupled with the transmission channel 35 and the controller 50. SNR is preferably defined as the ratio of average signal power to average noise power. The signal power can be determined by measuring the maximum amplitude and phase deviation of all received data prior to demodulation. The noise power can be determined by measuring the amplitude and phase distance between adjacent points in the modulation constellation as known to those skilled in the art. Alternatively, the SNR can be determined through a variety of other techniques, and any suitable method of determining the SNR can be adapted for use in the presently preferred system. Averaging many measurements of SNR can be performed to improve the accuracy of the current SNR calculations as known to those skilled in the art.

The signal to noise ratio monitor 70 preferably determines the SNR and generates an input signal 78 that varies as a function of the SNR. Alternatively, the input signal 78 can take many forms. The input signal 78 can be based in-whole or in-part on the SNR. The input signal 78 can be analog or digital and linear or non-linear as known to those skilled in the art. Alternatively, the input signal 78 can be binary such that the input signal 78 is greater than or less than a threshold value based upon the SNR as known to those skilled in the art. The SNR monitor 70 preferably determines the SNR and continuously generates the input signal 78. Alternatively, the SNR monitor 70 can determine the SNR and generate the input signal 78 in a sampled fashion on a random or non-random basis.

The means 54 for analyzing input signals preferably comprises means for determining whether the current data rate satisfies a threshold, based upon an analysis of the input signal 68. Alternatively, the means 54 for analyzing input signals can comprise means for determining the current data rate based upon an analysis of the input signal 68. Alternatively, the means 54 for analyzing input signals can analyze both input signals 68, 78. The means 54 for analyzing input signals is preferably implemented in computer readable program code written in any suitable programming language and implemented on an analog or a digital computer utilizing any suitable operating system. The means 54 for analyzing input signals can also be implemented through the use of hardware in the form of a hardwired computer, an integrated circuit, or a combination of hardware and computer readable program code.

The means 56 for providing an adaptive interleave control signal preferably comprises means for providing the input signal 78 as it is received from the SNR monitor 70. Accordingly, the adaptive interleave control signal 58 is preferably equivalent to the received input signal 78. Alternatively, the adaptive interleave control signal 58 can take many forms. The adaptive interleave control signal can be based in-whole or in-part on one or both of the input signals 68, 78. The adaptive interleave control signal 58 can be analog or digital and linear or non-linear as known to those skilled in the art. Alternatively, the adaptive interleave control signal 58 can be binary such that the adaptive interleave control signal produced is greater than or less than a threshold value based upon one or both of the input signals 68, 78 as known to those skilled in the art. The means 56 for providing an adaptive interleave control signal is preferably implemented in computer readable program code written in any suitable programming language and implemented on an analog or a digital computer utilizing any suitable operating system. The means 56 for providing an adaptive interleave control signal can also be implemented through the use of hardware in the form of a hardwired computer, an integrated circuit, or a combination of hardware and computer readable program code.

Figure 3:
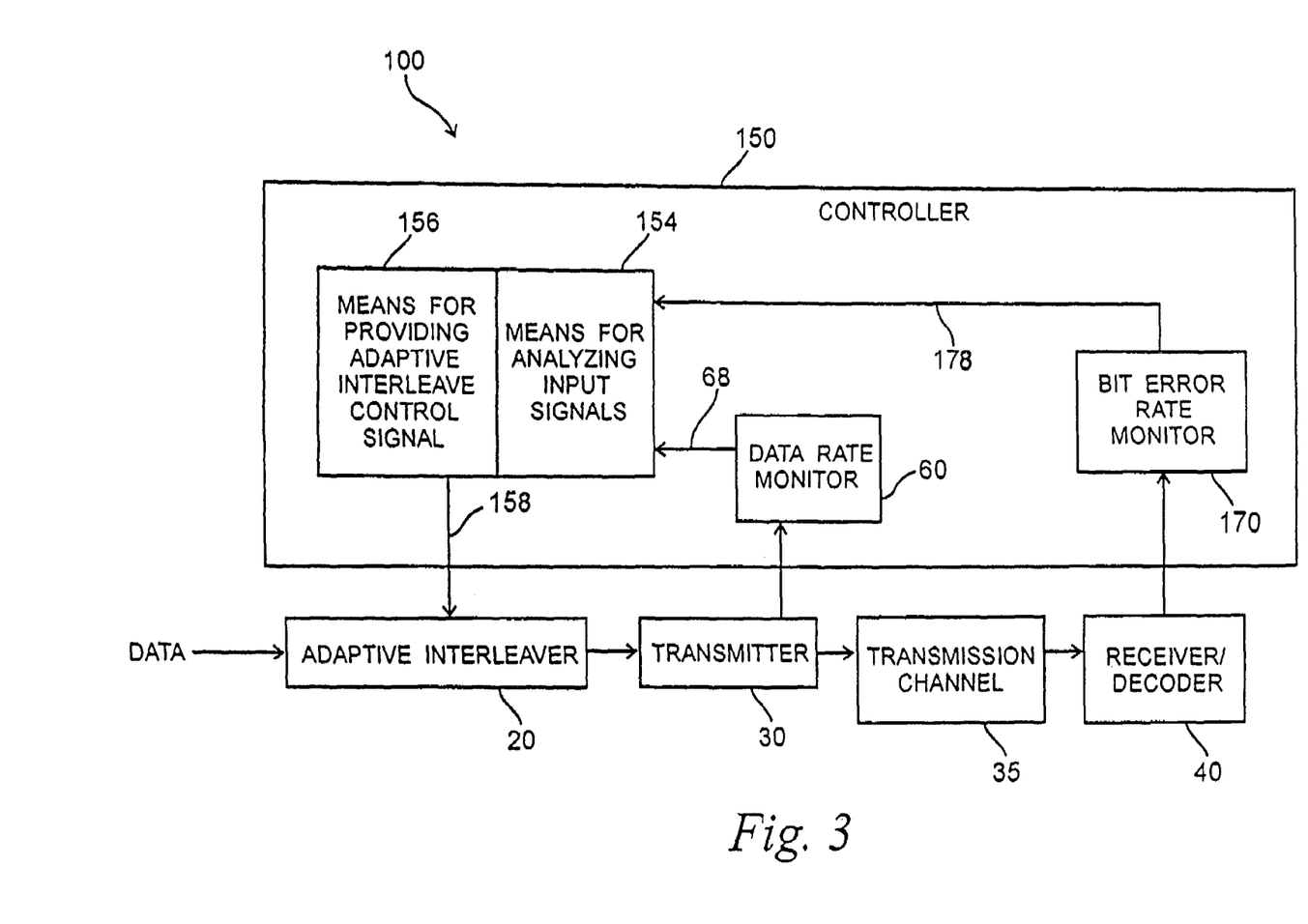
FIG. 3 is a more detailed block diagram of the adaptive interleaver controller of FIG. 1

Referring now to FIG. 3, a transmission system 100 comprising the adaptive interleaver 20, the transmitter 30, the transmission channel 35, the receiver/decoder 40 and a controller 150 according to an alternate embodiment is shown. The adaptive interleaver 20, transmitter 30, transmission channel 35 and receiver/decoder 40 are all the same as described above.

The controller 150 preferably comprises a data rate monitor 60, a bit error rate monitor 170, means 154 for analyzing input signals and means 156 for providing an adaptive interleave control signal. The data rate monitor 60 is the same as described above. The bit error rate monitor 170 preferably comprises a monitor for determining BER as known to those skilled in the art. The bit error rate monitor 170 is preferably coupled with the receiver/decoder 40 and the controller 150. BER is preferably defined as the relative frequency of error bits to received bits. The BER is preferably determined though the use of a cyclic redundancy code (CRC) in the encoded symbols. A CRC enables a bit error rate monitor to determine when errors in the decoded symbols occur. By monitoring the errors identified through the use of the CRC over a period of time, the BER of the system can be determined. Alternatively, BER can be determined through a variety of other techniques, and any suitable method of determining BER can be adapted for use in the presently preferred system. Averaging many measurements of BER can be performed to improve the accuracy of the current BER calculations as known to those skilled in the art.

The bit error rate monitor 170 preferably generates an input signal 178 that varies as a function of the BER. Alternatively, the input signal 178 can take many forms. The input signal 178 can be based in-whole or in-part on the BER. The input signal 178 can be analog or digital and linear or non-linear as known to those skilled in the art. Alternatively, the input signal 178 can be binary such that the input signal 178 is greater than or less than a threshold value based upon the BER as known to those skilled in the art. The BER monitor 170 preferably determines the BER and continuously generates the input signal 178. Alternatively, the BER monitor 170 can determine the BER and generate the input signal 178 in a sampled fashion on a random or non-random basis.

The means 154 for analyzing input signals preferably comprises means for determining whether the current data rate exceeds a predetermined threshold, based upon an analysis of the input signal 68. Alternatively, the means 154 for analyzing input signals can comprise means for determining the current data rate based upon an analysis of the input signal 68. Alternatively, the means 154 for analyzing input signals can analyze both of the input signals 68, 178. The means 154 for analyzing input signals is preferably implemented in computer readable program code written in any suitable programming language and implemented on an analog or a digital computer utilizing any suitable operating system. The means 154 for analyzing input signals can also be implemented through the use of hardware in the form of a hardwired computer, an integrated circuit, or a combination of hardware and computer readable program code.

The means 156 for providing an adaptive interleave control signal preferably comprises means for providing the input signal 178 as it is received from the BER monitor 170. Accordingly, the adaptive interleave control signal 158 is preferably equivalent to the received input signal 178. Alternatively, the adaptive interleave control signal 158 can take many forms. The adaptive interleave control signal 158 can be based in-whole or in-part on one or both of the input signals 68, 178. The adaptive interleave control signal 158 can be analog or digital and linear or non-linear as known to those skilled in the art. Alternatively, the adaptive interleave control signal 158 can be binary such that the adaptive interleave control signal 158 is greater than or less than a threshold value based upon one or both of the input signals 68, 178 as known to those skilled in the art. The means 156 for providing an adaptive interleave control signal in response to the input signals is preferably implemented in computer readable program code written in any suitable programming language and implemented on an analog or a digital computer utilizing any suitable operating system. The means 156 for providing an adaptive interleave control signal in response to the input signals can also be implemented through the use of hardware in the form of a hardwired computer, an integrated circuit, or a combination of hardware and computer readable program code.

While the controller 50, 150 and adaptive interleaver 20 are preferably implemented as separate elements as shown in FIGS. 1 and 2, they can alternatively be implemented as a single element comprising software, hardware or a combination thereof as described herein and known to those skilled in the art.

Figure 4:
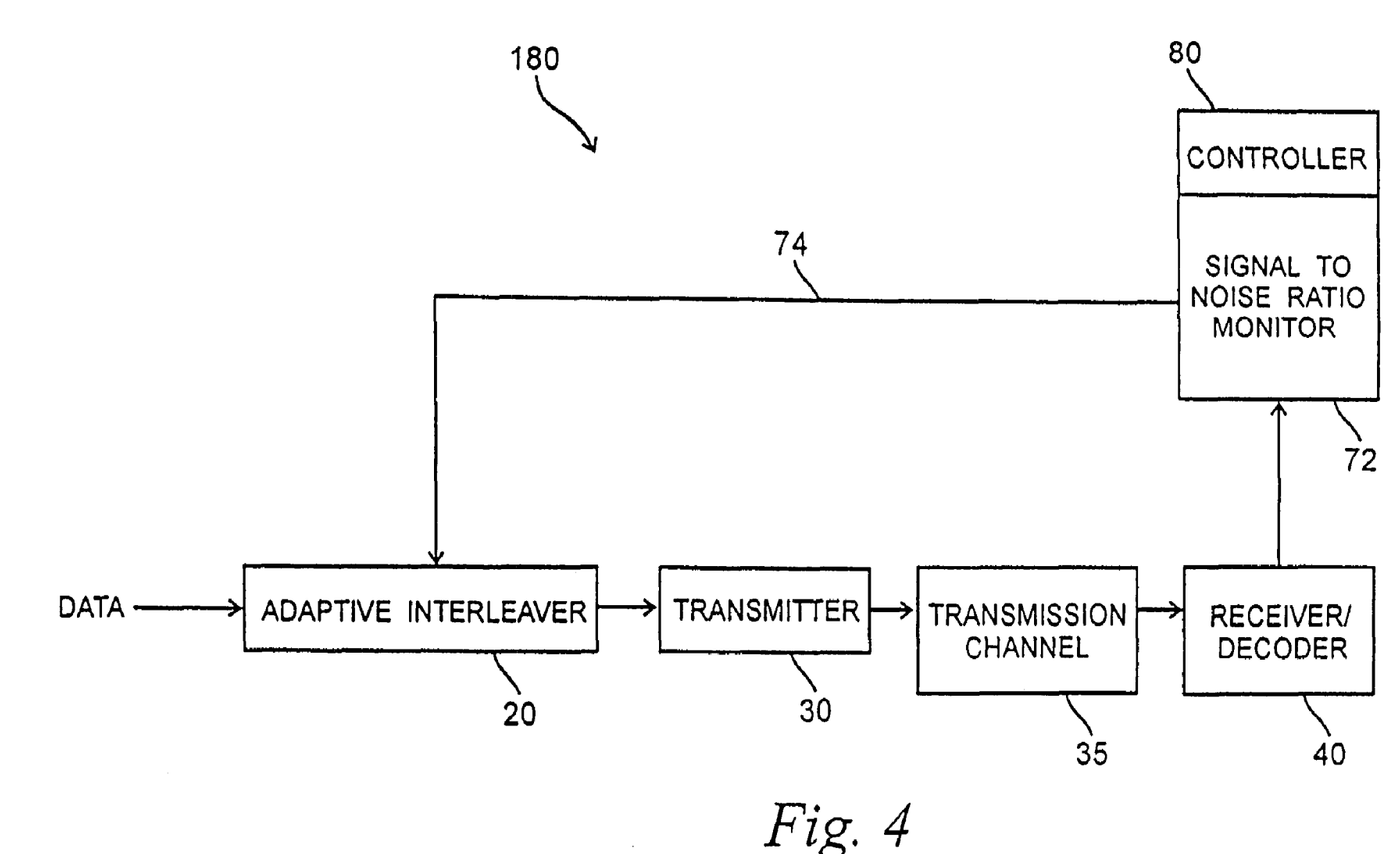
FIG. 4 is a more detailed block diagram of the adaptive interleaver controller of FIG. 1

Referring now to FIG. 4, a transmission system 180 comprising the adaptive interleaver 20, the transmitter 30, the transmission channel 35, the receiver/decoder 40 and a controller 80 is shown. The adaptive interleaver 20, transmitter 30, transmission channel 35 and receiver/decoder 40 are all the same as described above. The controller 80 preferably comprises a signal to noise ratio monitor 72 as described herein. The signal to noise ratio monitor 72 generates a multiple bit adaptive interleave control signal 74 that preferably varies as a function of the SNR. The adaptive interleave control signal 74 can be based in-whole or in-part on the SNR. The adaptive interleave control signal 74 can be analog or digital and linear or non-linear as known to those skilled in the art. Alternatively, the adaptive interleave control signal 74 can be binary such that the adaptive interleave control signal produced is greater than or less than a threshold value based upon the SNR as known to those skilled in the art. The controller 80 is preferably coupled with to the adaptive interleaver 20 such that the adaptive interleave control signal 74 is supplied directly to the adaptive interleaver 20. The adaptive interleave control signal 74 is preferably utilized by the adaptive interleaver 20 to control the interleave depth to generate an adaptively interleaved signal.

Figure 5:
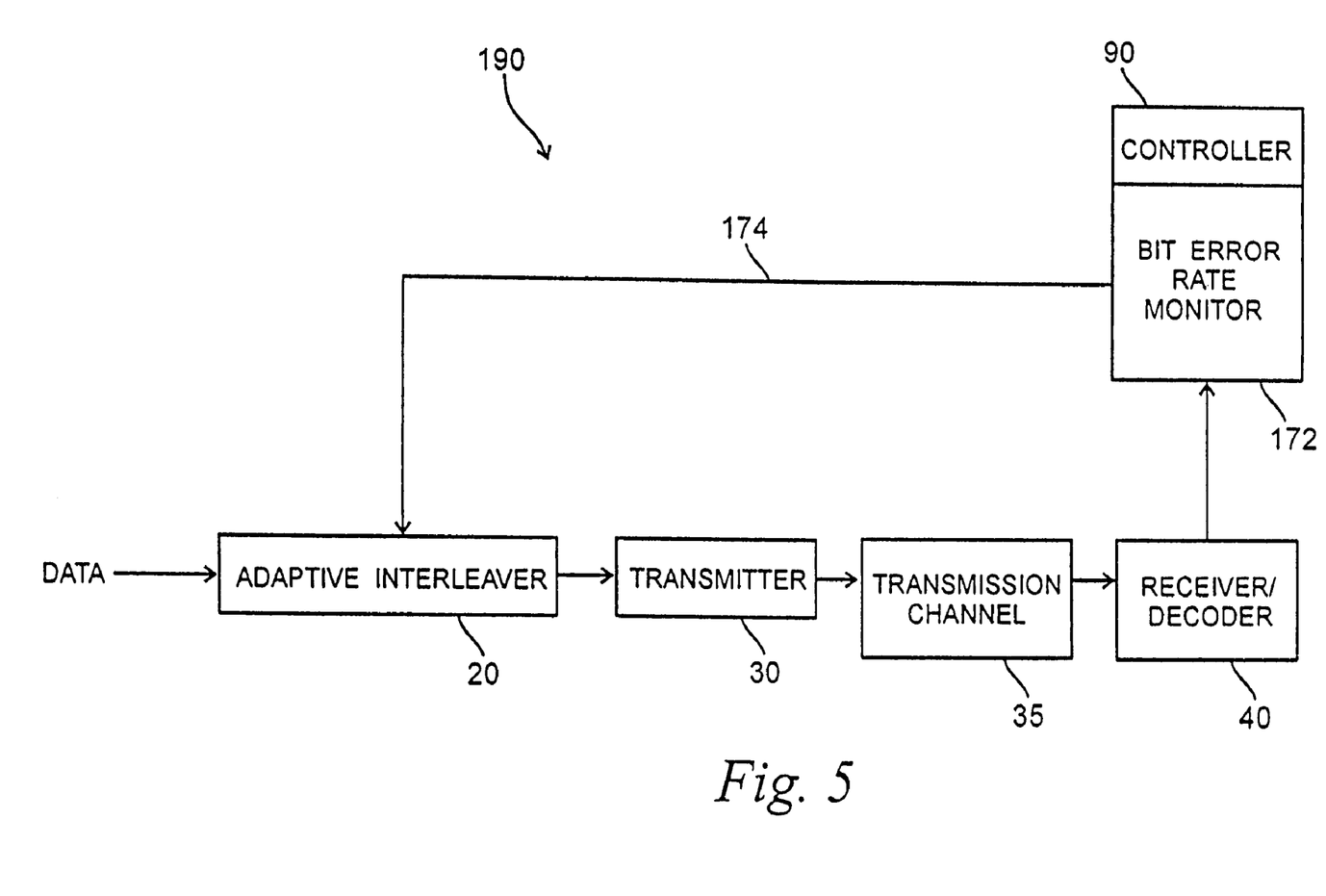
FIG. 5 is a more detailed block diagram of the adaptive interleaver controller of FIG. 1

Referring now to FIG. 5, a transmission system 190 comprising the adaptive interleaver 20, the transmitter 30, the transmission channel 35, the receiver/decoder 40 and a controller 90 is shown. The adaptive interleaver 20, transmitter 30, transmission channel 35 and receiver/decoder 40 are all the same as described above. The controller 90 preferably comprises a bit error rate monitor 172 as described herein. The bit error rate monitor 172 generates a multiple bit adaptive interleave control signal 174 that preferably varies as a function of the BER. The adaptive interleave control signal 174 can be based in-whole or in-part on the BER. The adaptive interleave control signal 174 can be analog or digital and linear or non-linear as known to those skilled in the art. Alternatively, the adaptive interleave control signal 174 can be binary such that the adaptive interleave control signal produced is greater than or less than a threshold value based upon the BER as known to those skilled in the art. The controller 90 is preferably coupled with the adaptive interleaver 20 such that the adaptive interleave control signal 174 is supplied directly to the adaptive interleaver 20. The adaptive interleave control signal 174 is preferably utilized by the adaptive interleaver 20 to control the interleave depth to generate an adaptively interleaved signal.

Figure 6:
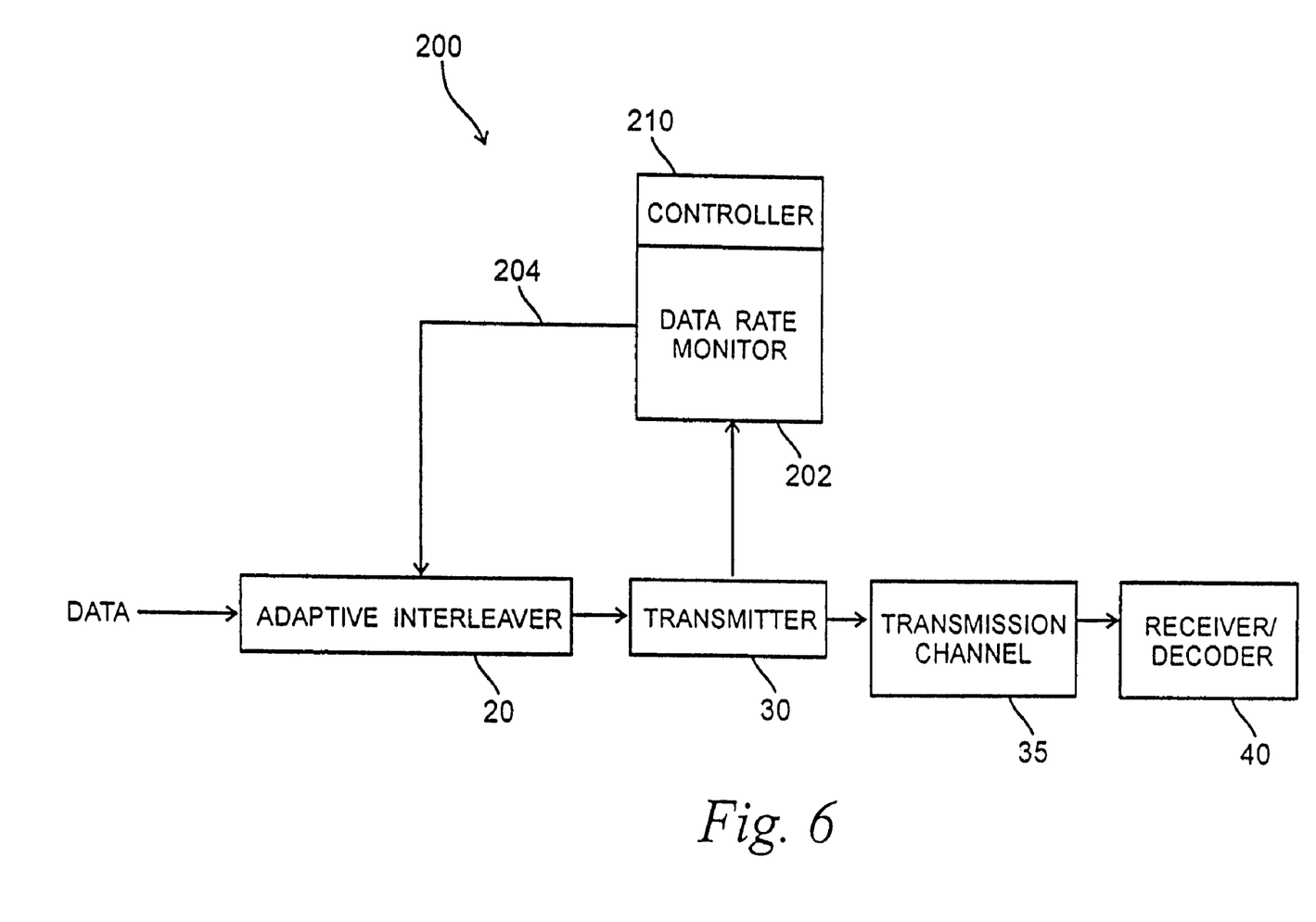
FIG. 6 is a more detailed block diagram of the adaptive interleaver controller of FIG. 1

Referring now to FIG. 6, a transmission system 200 comprising the adaptive interleaver 20, the transmitter 30, the transmission channel 35, the receiver/decoder 40 and a controller 210 is shown. The adaptive interleaver 20, transmitter 30, transmission channel 35 and receiver/decoder 40 are all the same as described above. The controller 210 preferably comprises a data rate monitor 202 as described herein. The data rate monitor 202 generates a multiple bit adaptive interleave control signal 204 that preferably varies as a function of the data rate. The adaptive interleave control signal 204 can be based in-whole or in-part on the data rate. The adaptive interleave control signal 204 can be analog or digital and linear or non-linear as known to those skilled in the art. Alternatively, the adaptive interleave control signal 204 can be binary such that the adaptive interleave control signal produced is greater than or less than a threshold value based upon the data rate. The controller 210 is preferably coupled with the adaptive interleaver 20 such that the adaptive interleave control signal 204 is supplied directly to the adaptive interleaver 20. The adaptive interleave control signal 204 is preferably utilized by the adaptive interleaver 20 to control the interleave depth to generate an adaptively interleaved signal.

Figure 7:
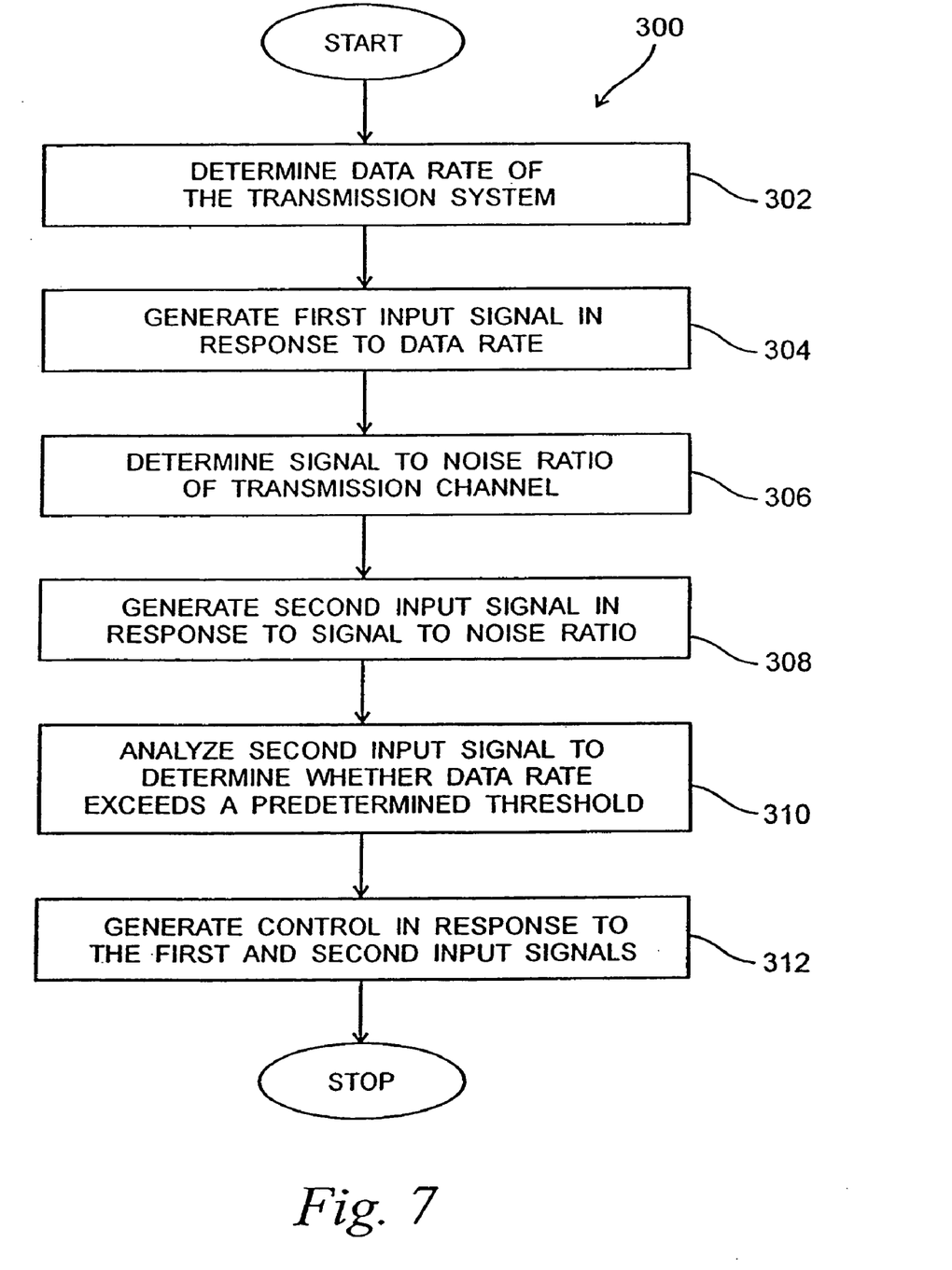
FIG. 7 is a flow chart of a method for controlling an adaptive interleaver of a first preferred embodiment.

The system shown in FIG. 2 can be used to implement the method 300 shown in FIG. 7. The data rate monitor 60 determines the data rate (step 302, FIG. 7) of the transmission system 10. The data rate monitor 60 generates an input signal 68 (step 304) that varies as a function of the data rate. The signal to noise ratio monitor 70 determines a SNR (step 306) of the system 10. The signal to noise ratio monitor 70 generates an input signal 78 (step 308) that varies as a function of the SNR. The controller 50 analyzes the first input signal 68 (step 310) and determines whether the data rate exceeds a predetermined threshold. The controller 50 provides an adaptive interleave control signal 58 (step 312) in response to the input signals 68, 78.

Figure 8:
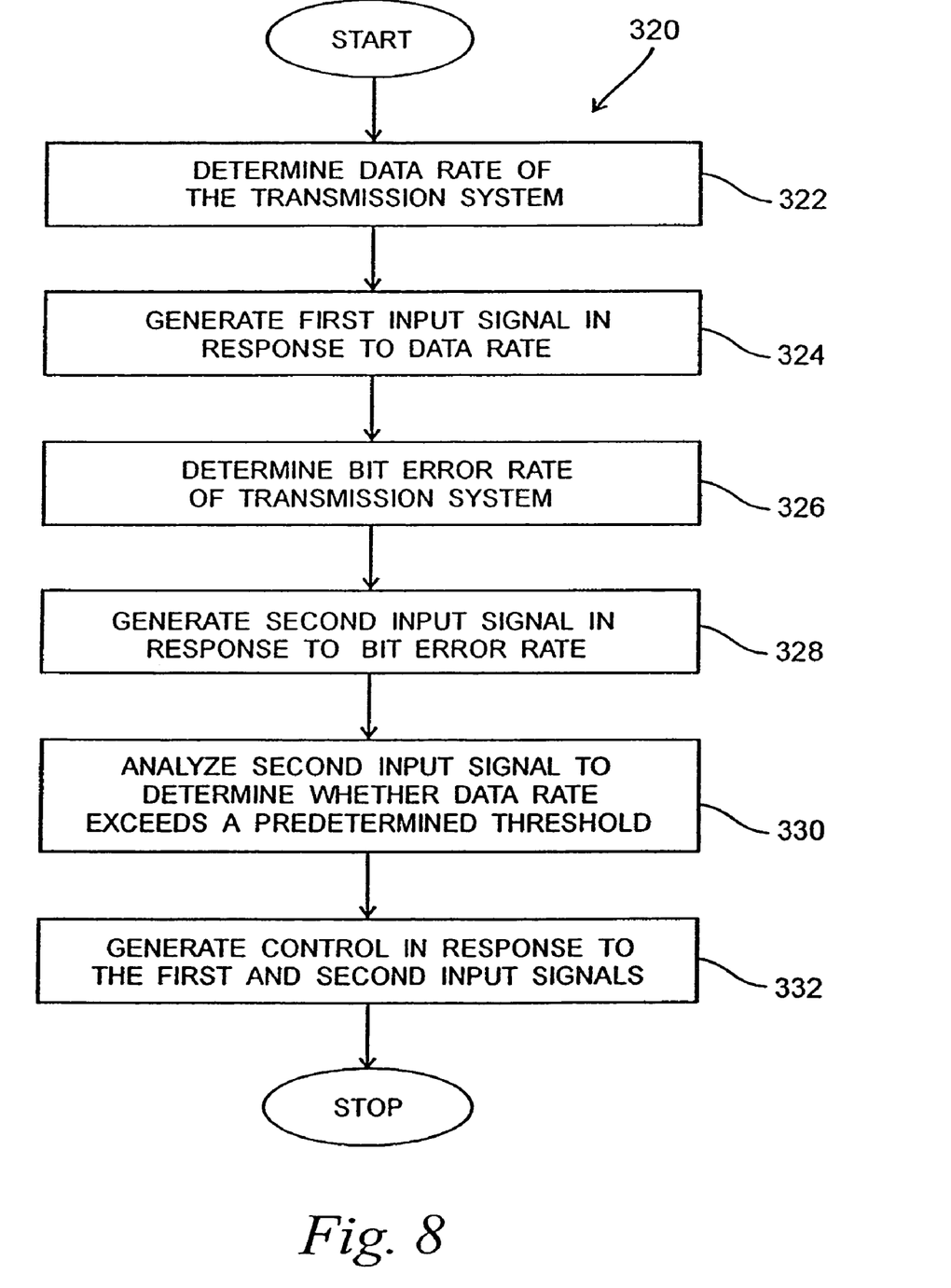
FIG. 8 is a flow chart of a method for controlling an adaptive interleaver of a second preferred embodiment.

The system shown in FIG. 3 can be used to implement the method 320 shown in FIG. 8. The data rate monitor 60 determines the data rate (step 322, FIG. 8) of the transmission system 100. The data rate monitor 60 generates a first input signal (step 324) that varies as a function of the data rate. The bit error rate monitor 170 determines a BER (step 326) for the transmission system 100. The bit error rate monitor 170 generates a second input signal (step 328) that varies as a function of the BER. The controller 150 analyzes the first input signal 68 (step 330) and determines whether the data rate exceeds a predetermined threshold. The controller provides an adaptive interleave control signal (step 332) in response to the input signals 68, 178.

In a preferred embodiment, the predetermined threshold is determined in relation to the data rate. When the data rate is above a certain level, the system cannot afford the decoder the additional time needed to de-interleave the interleaved data. Thus, for data rates above a certain level, interleaving imposes an unacceptable time delay on the transmissions. Therefore, when the data rate exceeds the predetermined threshold, interleaving is preferably disabled. When the controller 50, 150 determines that the data rate exceeds the predetermined threshold, the controller 50, 150 preferably generates an adaptive interleave control signal 58, 158 (respectively) that controls the adaptive interleaver 20 such that no interleaving is implemented by the adaptive interleaver 20. Alternatively, when the data rate exceeds the predetermined threshold, the controller 50, 150 can cease generating an adaptive interleave control signal such that no interleaving is implemented by the adaptive interleaver 20. Thus, interleaving is only implemented when the data rate is below a certain level.

Alternatively, if the data rate is below the predetermined threshold, the controller 50, 150 preferably generates an adaptive interleave control signal 58, 158 that controls the adaptive interleaver 20 such that interleaving is implemented. The adaptive interleave control signal 58, 158 preferably causes the adaptive interleaver 20 to implement an interleave depth that is proportional to the SNR, BER, data rate or combination thereof. Alternatively, the interleave depth can be inversely proportional to the SNR, BER, data rate or combination thereof. Alternatively, the adaptive interleave control signal 58, 158 can cause the adaptive interleaver 20 to implement a number of different interleave depths depending upon the SNR, BER, data rate or combination thereof. For example, the controller 50, 150 can implement five different graduated interleave depths in response to the SNR or BER, assuming that the data rate is high enough to allow for such interleaving. Each of the different graduated interleave depths is implemented when the SNR or BER is within a predetermined range of values.

Figure 9:
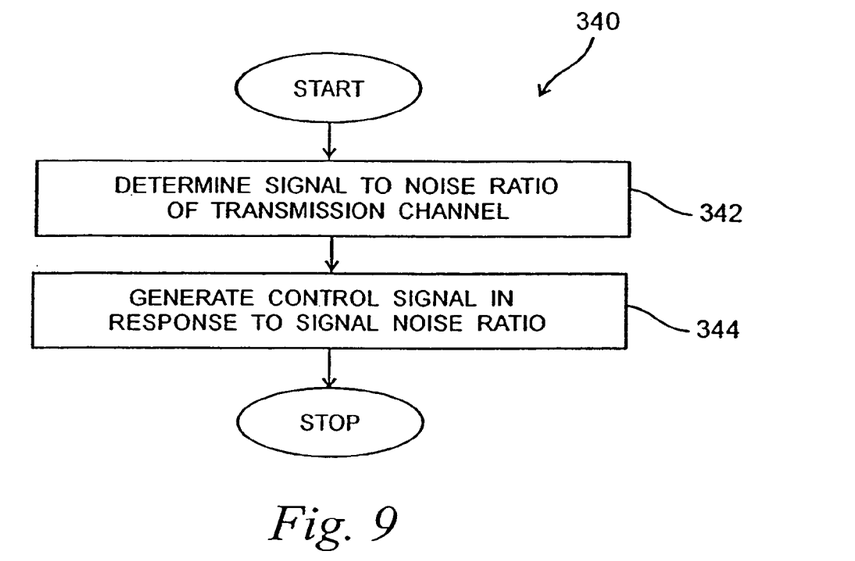
FIG. 9. is a flow chart of a method for controlling an adaptive interleaver of a third preferred embodiment.

The system of FIG. 4 can be used to implement the method 340 of FIG. 9. The signal to noise ratio monitor 72 determines a SNR (step 342) of the transmission system 180. The signal to noise ratio monitor 72 generates an adaptive interleave control signal 74 (step 344) that preferably varies as a function of the SNR. The adaptive interleaver 20 receives the adaptive interleave control signal and preferably adapts an interleave depth in response to the adaptive interleave control signal 74.

Figure 10:
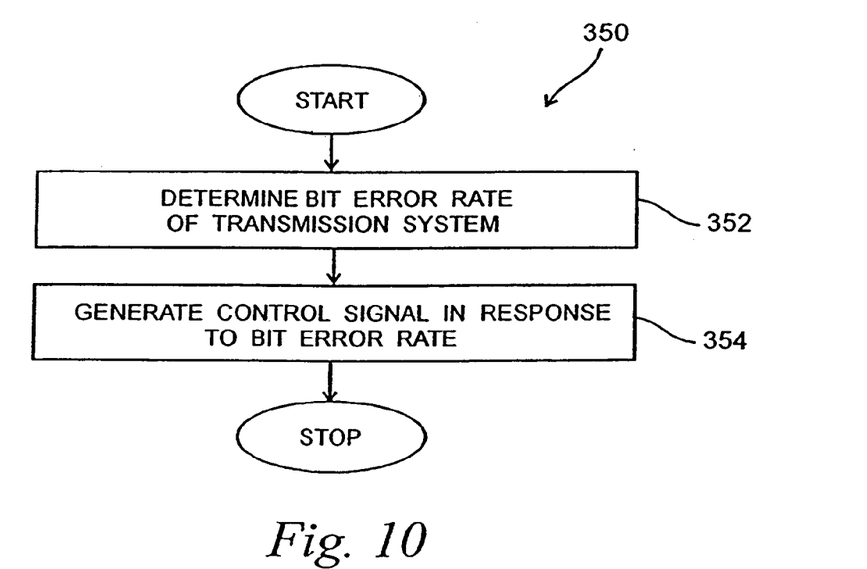
FIG. 10. is a flow chart of a method for controlling an adaptive interleaver of a fourth preferred embodiment.

The system of FIG. 5 can be used to implement the method 350 of FIG. 10. The bit error rate monitor 172 determines a BER (step 352) of the transmission system 190. The bit error rate monitor 172 generates an adaptive interleave control signal 174 (step 354) that preferably varies as a function of the BER. The adaptive interleaver 20 receives the adaptive interleave control signal preferably adapts an interleave depth in response to the adaptive interleave control signal 174.

Figure 11:
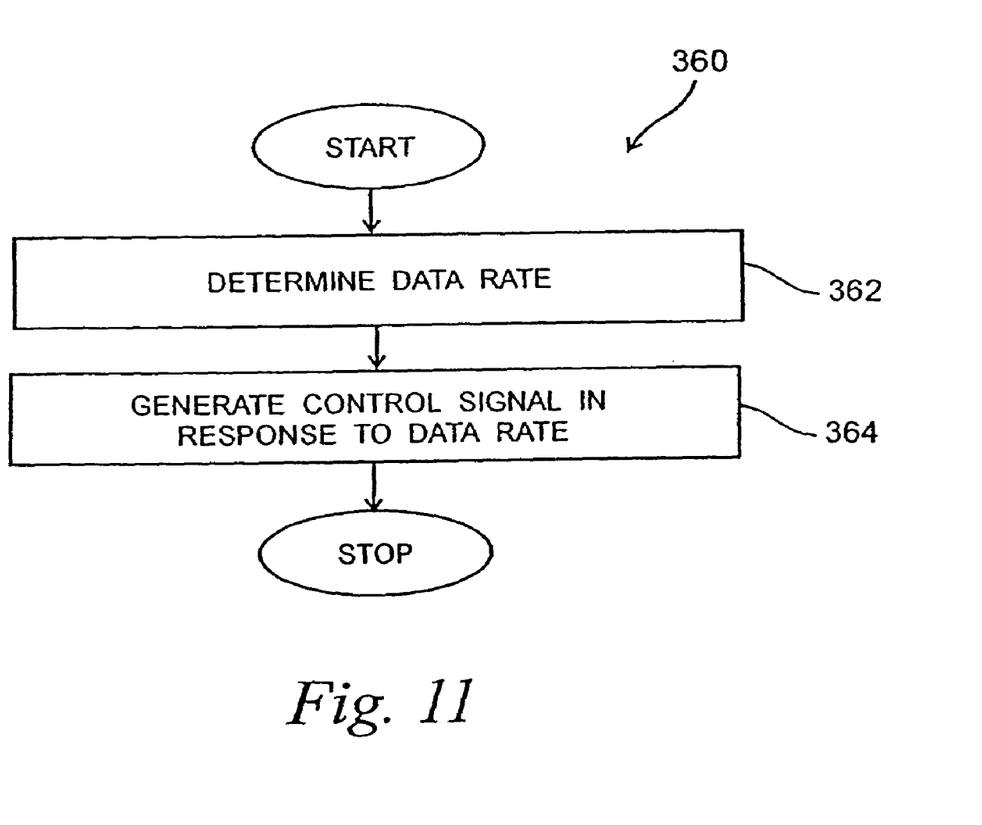
FIG. 11 is a flow chart of a method for controlling an adaptive interleaver of a fifth preferred embodiment.

The system of FIG. 6 can be used to implement the method 360 of FIG. 11. The data rate monitor 202 determines a data rate (step 362) of the system 200. The data rate monitor 202 generates an adaptive interleave control signal 204 (step 364) that preferably varies as a function of the data rate. The adaptive interleaver 20 receives the adaptive interleave control signal and preferably adapts an interleave depth in response to the adaptive interleave control signal 204.

It is to be understood that during operation, the interleave depth implemented by the adaptive interleaver 20 (FIGS. 2, 3, 4, 5 and 6) is generally communicated to the receiver/decoder 40 at the other end of the transmission channel 35 as known to those skilled in the art. If the interleave depth is adjusted solely as a function of the data rate, both the adaptive interleaver 20 and the receiver/decoder 40 can monitor the current data rate, and can synchronize the interleaving depth through the use of the same interleave depth control rules as known to those skilled in the art. However, if the SNR or the BER is used to determine the interleave depth, additional mechanisms can be used to assure that the interleave depth implemented by the adaptive interleaver 20 matches the interleave depth of a de-interleaver during the decoding process as known to those skilled in the art. Accordingly, the current interleave depth being used by the adaptive interleaver 20 can be transmitted to the receiver/decoder 40 for use in the decoding process. The components and methods required to perform such a transmission and synchronize the encoding and decoding processes are well known to those skilled in the art.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

What is claimed is:

1. A controller for an adaptive interleaver comprising:
a processor that is operative to receive a first signal that is indicate of a bit error rate of a transmission channel, receive a second signal that is indicative of a data rate of the transmission channel, analyze the first and second signals, and generate a control signal after analyzing the first and second signals.

2. The invention of claim 1, wherein the processor is further operative to determine whether the first signal exceeds a threshold.

3. The invention of claim 1, wherein the processor is further operative to determine whether the first signal exceeds a value.

4. The invention of claim 1, wherein the processor is further operative to determine whether the second signal exceeds a threshold.

5. The invention of claim 1, wherein the processor is further operative to determine whether the second signal exceeds a value.

6. The invention of claim 1, further comprising an adaptive interleaver coupled with the processor, the adaptive interleaver being operative to receive the control signal.

7. The invention of claim 6, wherein the adaptive interleaver is operative to alter an interleaved signal in response to the control signal.

8. The invention of claim 6, wherein the adaptive interleaver is operative to alter the interleave depth of an interleaved signal in response to the control signal.

* * * * *